(12) United States Patent
Bravi

(10) Patent No.: US 11,251,894 B2
(45) Date of Patent: Feb. 15, 2022

(54) APPARATUS AND METHOD TO REDUCE THE IMPACT OF COHERENT CROSSTALK IN OPTICAL NETWORKS

(71) Applicant: Infinera Corporation, Annapolis Junction, MD (US)

(72) Inventor: Emilio Bravi, Hillsdale, NJ (US)

(73) Assignee: Infinera Corporation, San Jose, CA (US)

(*) Notice: Subject to any disclaimer, the term of this patent is extended or adjusted under 35 U.S.C. 154(b) by 0 days.

(21) Appl. No.: 16/218,040

(22) Filed: Dec. 12, 2018

(65) Prior Publication Data

US 2020/0313787 A1   Oct. 1, 2020

(51) Int. Cl.
   *H04J 14/02* (2006.01)
   *H01R 13/6461* (2011.01)

(52) U.S. Cl.
   CPC ...... *H04J 14/0212* (2013.01); *H01R 13/6461* (2013.01); *H04J 14/0213* (2013.01); *H04J 14/0256* (2013.01)

(58) Field of Classification Search
   CPC ............... H04J 14/0212; H04J 14/0213; H04J 14/0256; H04J 14/00; H04J 14/02; H01R 13/6461; G02B 6/26; G02B 6/28; G02B 6/293; G02F 1/035; H04B 10/00; H04B 10/03; H04B 10/032; H04B 10/04; H04B 10/071; H04B 10/073; H04B 10/077; H04B 10/079; H04B 10/572; H04Q 11/00
   USPC ........................................................ 398/83
   See application file for complete search history.

(56) References Cited

U.S. PATENT DOCUMENTS

| | | | | |
|---|---|---|---|---|
| 8,693,873 B2* | 4/2014 | Zhou | ............... | H04J 12/0208 398/83 |
| 9,042,729 B2* | 5/2015 | Barnard | ............. | H04J 14/0256 398/79 |
| 9,900,124 B2* | 2/2018 | McNicol | .............. | H04J 14/06 |
| 9,929,826 B2* | 3/2018 | Mitchell | ............. | H04J 14/0221 |
| 2012/0087658 A1* | 4/2012 | Jander | ............... | H04Q 11/0005 398/48 |
| 2012/0251121 A1* | 10/2012 | McNicol | .............. | H04J 14/06 398/91 |
| 2013/0142510 A1* | 6/2013 | Zhou | ............... | H04J 14/0204 398/48 |
| 2015/0208146 A1* | 7/2015 | Younce | ............... | H04J 14/0212 398/21 |
| 2015/0215066 A1* | 7/2015 | Testa | ...................... | H04J 14/06 398/48 |

(Continued)

OTHER PUBLICATIONS

Bennett, Geoff, Inventing the Colorless, Directionless, and Contentionless ROADM, https://www.infinera.com/inventing-the-colorless-directionless-and-contentionless-roadm/, Nov. 28, 2018.

*Primary Examiner* — Abbas H Alagheband
(74) *Attorney, Agent, or Firm* — David L. Soltz

(57) ABSTRACT

Optical networks, nodes and methods are disclosed. To solve the aggressor issue and to reduce the cross-talk caused by the aggressors in colorless, directionless and contentionless reconfigurable optical add drop multiplexer nodes, the present disclosure configures a first broadcast module to supply only non-adjacent wavelengths to a first input port of a wavelength selective switch, and a second broadcast module to supply only non-adjacent wavelengths to a second input port of the wavelength selective switch.

6 Claims, 5 Drawing Sheets

(56) References Cited

U.S. PATENT DOCUMENTS

2016/0191203 A1* 6/2016 Mitchell ................ H04B 10/00
                                                            714/776
2016/0315712 A1* 10/2016 Vassilieva ........... H04J 14/0201
2018/0076918 A1*  3/2018 Boduch .................. H04B 10/66
2018/0234199 A1*  8/2018 Bouda ................. H04B 10/572
2018/0267266 A1*  9/2018 Yilmaz ............... H04J 14/0221
2018/0359047 A1* 12/2018 Vassilieva ........... H04J 14/0298

* cited by examiner

APPARATUS AND METHOD TO REDUCE THE IMPACT OF COHERENT CROSSTALK IN OPTICAL NETWORKS

INCORPORATION BY REFERENCE

Not Applicable.

FIELD OF THE DISCLOSURE

The disclosure generally relates to methods and apparatuses for reducing the impact of coherent crosstalk in optical networks. More particularly the disclosure relates to methodologies based on using wavelength channel plans in which only non-adjacent carriers are supplied to an input port of a multiplexer to reduce the impact of coherent crosstalk in colorless, directionless, and contentionless networks.

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal), which may be collectively integrated onto a common semiconductor substrate.

A WDM system may also include a receiver circuit, such as a receiver (Rx) PIC, having a photodiode, and an optical demultiplexer circuit (referred to as a "demultiplexer") configured to receive the combined output and demultiplex the combined output into individual optical signals.

A WDM system may also include a set of nodes (e.g., devices of the WDM system that may be utilized to route the multiple optical signals, add another optical signal to the multiple optical signals, drop an optical signal from the multiple optical signals, or the like). During transmission of an optical signal in a WDM system, a set of intermediate nodes, such as a set of reconfigurable add-drop multiplexers (ROADMs), may be utilized to route and/or amplify the optical signal.

ROADMs are characterized by the number of fiber optic cables that the ROADMs can be connected to. Each fiber optic cable that a particular ROADM can be connected to is referred to in the art as a "degree". Thus, if a particular ROADM is configured to be connected to four fiber optical cables, then such ROADM is referred to in the art as having four degrees. For each degree, the ROADM has an optical device known as a wavelength selective switch connected to the fiber optic cable. The wavelength selective switch has a plurality of input ports, and functions to combine and shape the spectrum of light received at the input ports into a single combined signal that is passed onto the fiber optic cable. Shaping the light received at the plurality of input ports includes blocking optical signals having undesired wavelengths of light received at the input ports so that the single combined signal does not include the blocked optical signals. To block the undesired optical signals, each of the input ports of the wavelength selective switch includes a separate reconfigurable filter.

ROADMs may also be provided with a splitter which splits light and directs the light to ports of the wavelength selective switches. In colorless, directionless and contentionless networks, the splitter broadcasts each wavelength of light to all of the N degrees of the node and the wavelength selective switches selects, for each degree, which wavelengths are blocked and which wavelengths are let through. This selection and blocking is implemented by configuring the reconfigurable filter at each input port of the wavelength selective switch. To block a certain number M of wavelengths, the reconfigurable filter is configured to block the M wavelengths and to pass the unblocked wavelengths. Due to the imperfect isolation of the reconfigurable filter, a small fraction of the blocked wavelengths leak. If the blocked wavelength and the wavelength that is allowed through occupy the same spectral region, then this causes coherent crosstalk to the wavelength that is allowed through. These blocked wavelengths that inadvertently leak through are referred to as "aggressors".

The reconfigurable filters in the wavelength selective switch are constituted by a combination of individually controllable "slices" of spectrum. The wavelength selective switch sets the attenuation of each individual slice of spectrum to achieve the filter shape required to either block or allow through a wavelength.

Hence, there is a need to reduce the coherent crosstalk in the unblocked wavelengths to improve the signal to noise ratio in the optical signals transmitted by the wavelength selective switch.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
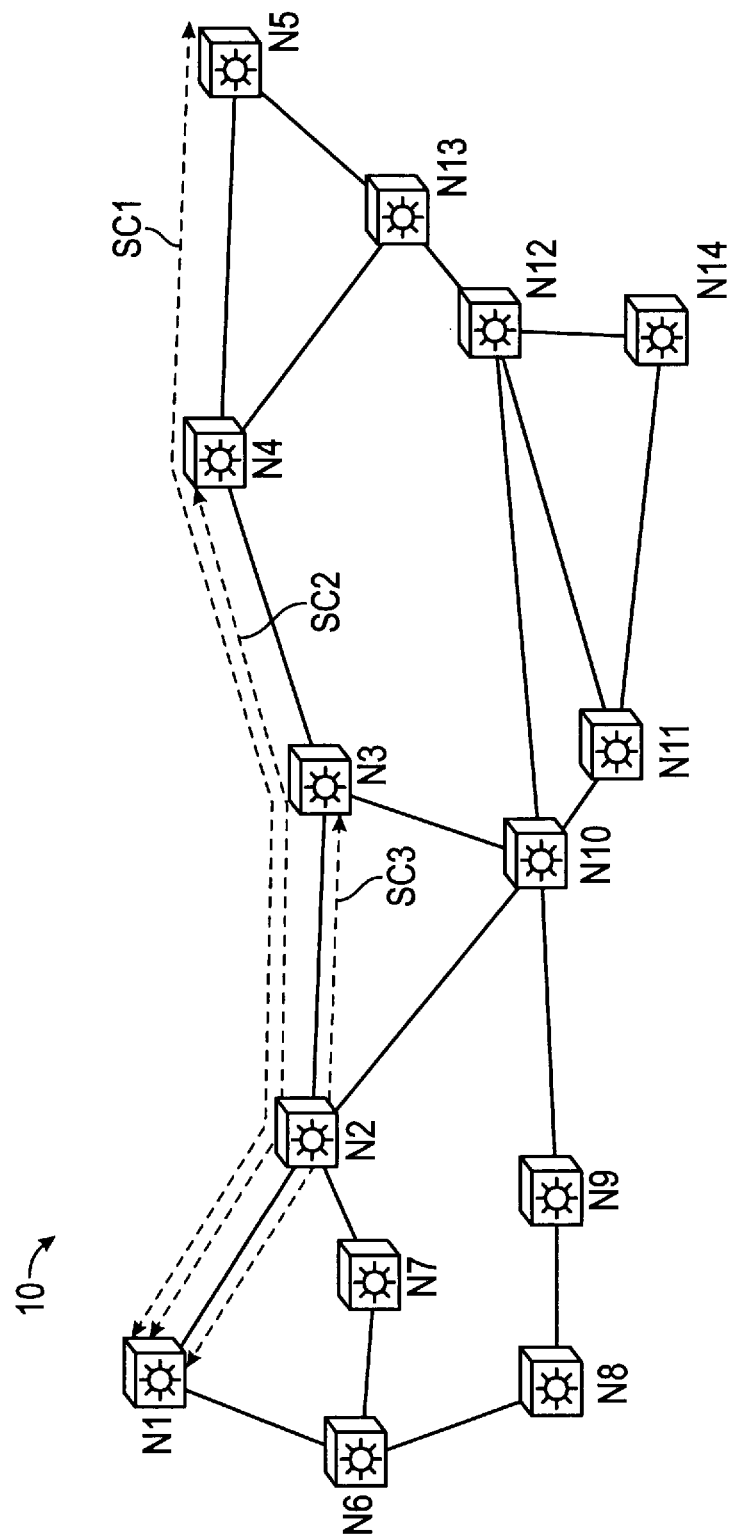
FIG. 1 illustrates an optical communication system consistent with aspects of the present disclosure.

The following detailed description refers to the accompanying drawings. The same reference numbers in different drawings may identify the same or similar elements.

The mechanisms proposed in this disclosure circumvent the problems described above. To solve the aggressor issue and to reduce the cross-talk caused by the aggressors as described in the background, the present disclosure uses wavelength channel plans in which only non-adjacent carriers are supplied to an input port of a wavelength selective switch within a colorless, directionless and contentless node to reduce the impact of coherent crosstalk in colorless, directionless, and contentionless networks.

Definitions

If used throughout the description and the drawings, the following short terms have the following meanings unless otherwise stated:

Band: The complete optical spectrum carried on the optical fiber. Depending on the fiber used and the supported spectrum which can be carried over long distances with the current technology, relevant examples of the same are: C-Band/L-Band/Extended-C-Band.

LS (Light source): A card where the digital transport client is modulate/de-modulated to/from an optical channel. This is the place where the optical channel originates/terminates.

OA (Optical Amplifier) stands for a band control gain element generally EDFA or RAMAN based.

PD (Photo-Diode) stands for a device which can measure the power levels in the complete band.

SCH (Super Channel/Optical Channel) stands for a group of wavelengths sufficiently spaced so as not to cause any interference among the group of wavelengths. The group of wavelengths may be sourced from a single light source and managed as a single grouped entity for routing and signaling in an optical network.

WSS (Wavelength Selective Switch) is a component used in optical communications networks to route (switch) optical signals between optical fibers on a per-slice basis. Generally power level controls can also be done by the WSS by specifying an attenuation level on a reconfigurable pass-band filter. A wavelength Selective Switch is a programmable device having source and destination fiber ports where the source and destination fiber ports and associated attenuation can be specified for a pass-band.

Slice stands for an N GHz (N=12.5, 6.25, 3.125) spaced frequency band of the whole of the optical spectrum each such constituent band is called a slice. A slice is the spectral resolution at which the wavelength selective switch operates to build the filter response. A channel (or super-channel) pass-band is composed of a set of contiguous slices.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

An optical communication system 10 is shown in FIG. 1. As shown, optical communication system 10 comprises a plurality of interconnected nodes N1 to N14 that may span across the United States, for example. Each node, e.g., N1 to N14, may enable high capacity WDM optical transport and digital add/drop flexibility for multiplexing a plurality of optical signals traversing the optical communication system 10. Optical signals are preferably grouped according to a plurality of superchannels SC1, SC2, for example, as described with respect to FIG. 3 below. Each node N1 to N14 preferably uses the exemplary systems and methods discussed below to transmit and receive carriers, such as superchannels, SC1, SC2, and SC3, in the optical communication system 10. The exemplary systems and methods discussed below may enable nodes N1 to N14 to convert optical signals received from interconnected nodes to the electrical domain for processing, and then convert the electrical signals back into optical signals for forwarding to other interconnected nodes. In other embodiments, at least one of the nodes N1 to N14 is a reconfigurable optical add drop multiplexer having multiple degrees which is configured to route the optical signals in the optical domain without converting the optical signals to the electrical domain for processing.

The exemplary optical communication system 10 can be implemented by deploying nodes, N1 to N14, anywhere in the network where access is desired. Some nodes may even be implemented, such as shown with respect to node N2 in FIG. 1, to simply route or pass one or more superchannels, SC1, SC2, and SC3, to other nodes in the network without processing the data that is carried by the superchannels.

Figure 2:
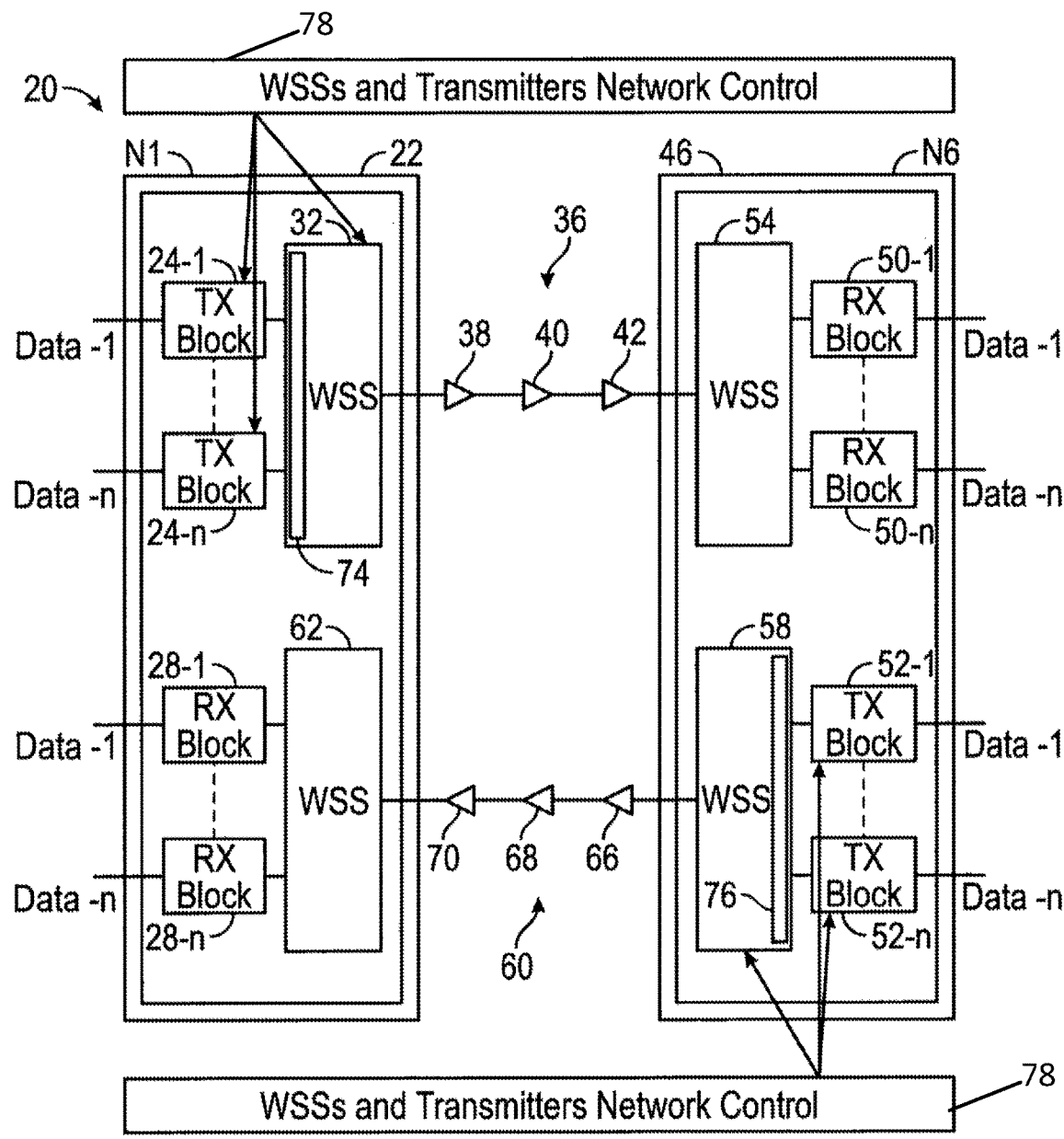
FIG. 2 illustrates an optical link consistent with aspects of the present disclosure.

FIG. 2 illustrates a sub network 20 of the optical communication system 10 consistent with the present disclosure in which nodes N1 and N6, for example, include transmitter blocks and receiver blocks.

As shown in FIG. 2, the node N1 includes a first rack, cabinet, chassis, or housing 22, which includes a plurality of transmitter blocks (Tx Block) 24-1 to 24-$n$, and a plurality of receiver blocks (Rx Block) 28-1 to 28-$n$. Similar to the above, each of the transmitter blocks 24-1 to 24-$n$ receives a corresponding one of a plurality of data or information streams Data-1 to Data-n, and, in response to a respective one of these data streams, each of transmitter blocks 24-1 to 24-$n$ may output a group of optical signals or a superchannel to a wavelength selective switch 32, which multiplexes a plurality of superchannels together onto optical communication path 36. As shown, optical communication path 36 may include one or more segments of optical fiber and optical amplifiers 38, 40, and 42, for example, to optically amplify or boost the power of the transmitted optical signals.

As further shown in FIG. 2, the sub network 20 includes a second rack, cabinet, chassis, or housing 46, which includes a plurality of receiver blocks 50-1 to 50-$n$ and a plurality of transmitter blocks 52-1 and 52-$n$. A wavelength selective switch 54 may include one or more optical filters, for example, and supply each group of received optical signals to a corresponding one of receiver blocks (Rx Blocks) 50-1 to 50-$n$. Each of receiver blocks 50-1 to 50-$n$, in turn, supplies a corresponding copy of data or information streams Data-1 to Data-n in response to the optical signals. Transmitter blocks 52-1 to 52-$n$ and wavelength selective switch 58 function similarly as transmitter blocks 24-1 to 24-$n$ and wavelength selective switch 32 provided in housing 22 in order to provide bi-directional communication via a communication path 60 between interconnected nodes N2 to N6 shown in FIG. 1. Accordingly, receiver blocks 28-1 to 28-$n$ and wavelength selective switch 62 also function similarly as receiver blocks 50-1 to 50-n and wavelength selective switch 54, respectively. As shown, optical communication path 60 also may include one or more segments of optical fiber and optical amplifiers 66, 68, and 70, for example, to optically amplify or boost the power of the transmitted optical signals. The wavelength selective switches 32 and 58 include reconfigurable filters 74 and 76 that can be configured to pass certain wavelengths of light and block other wavelengths of light as discussed herein.

As further shown in FIG. 2, the subnetwork 20 also includes at least one network controller 78 that communicates with the transmitter blocks 24-1-24-n, and 52-1-52-n, and wavelength selective switches 32 and 58. The network controller 78 includes network control software stored on a non-transitory computer readable medium, that makes sure that the reconfigurable filters 74 and 76 are configured as discussed herein, e.g., are centered around a wavelength added by the transmitter blocks 24-1-24-n, and 52-1-52-n. The network control software is run on a suitable processor, such as a microprocessor, FPGA, digital signal processor or the like to send configuration instructions to the reconfigurable filters 74 and 76. The term processor, as used herein, refers to a single processor or multiple processors working together.

Figure 3:
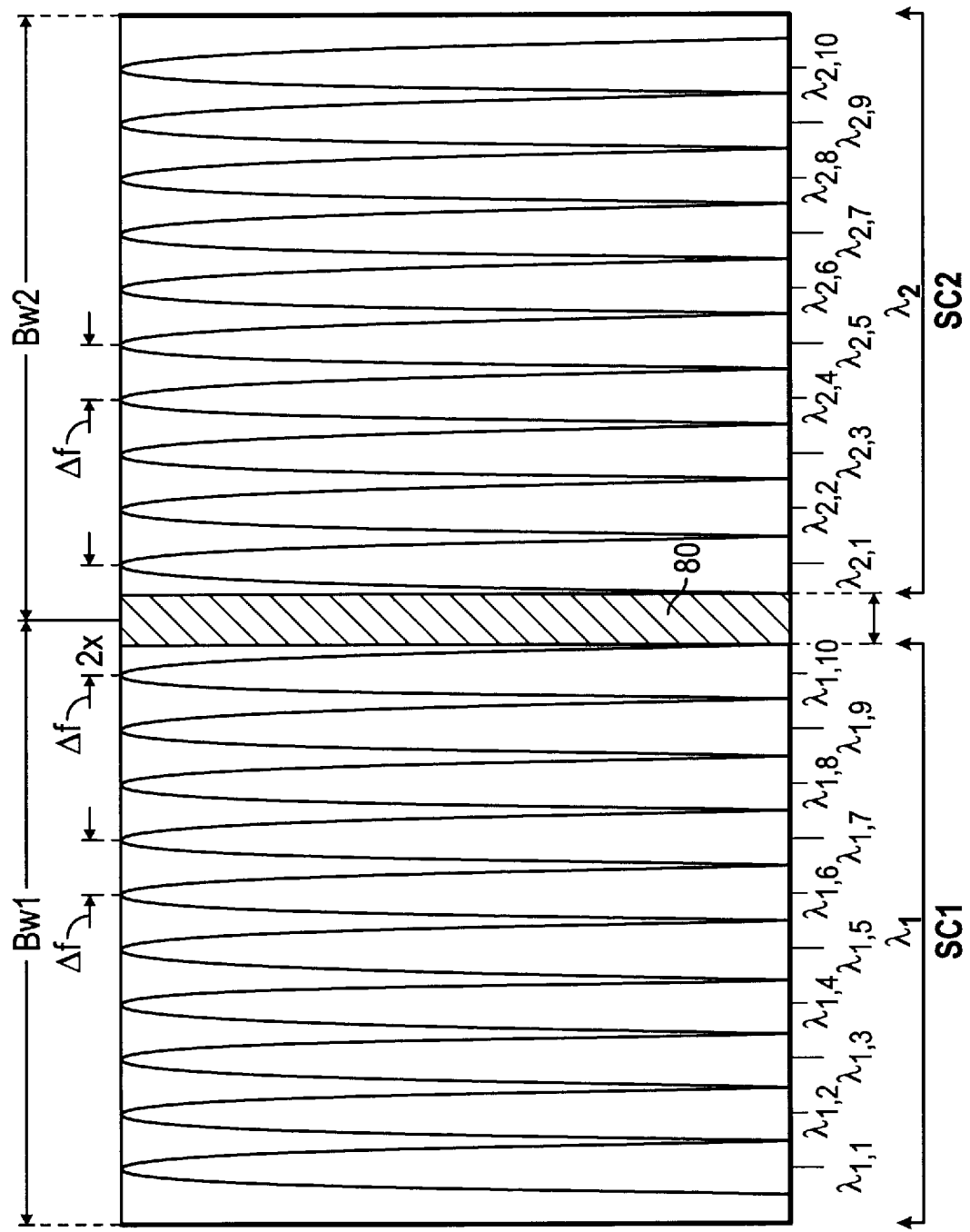
FIG. 3 illustrates a wavelength plan for a superchannel transmitted in an optical communication system consistent with aspects of the present disclosure.
Figure 3A:
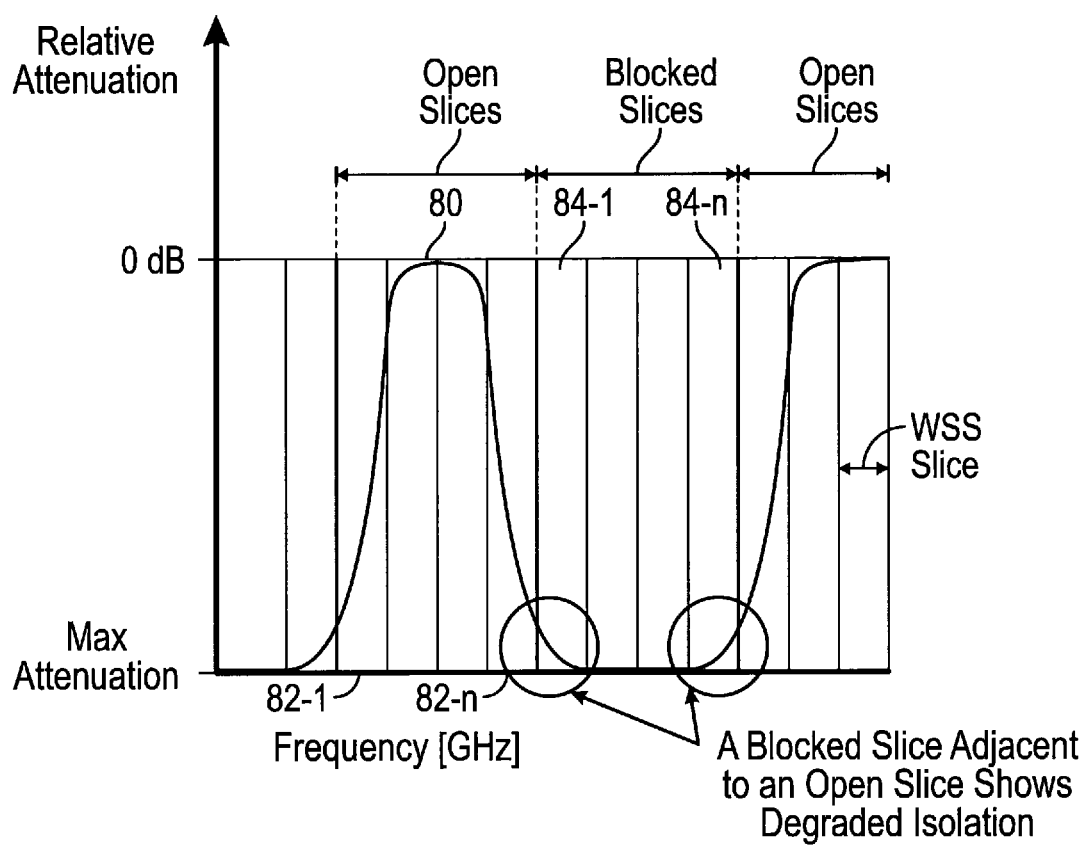
FIG. 3A Illustrates the filter response and the individual slices of a wavelength selective switch consistent with aspects of the present disclosure.

FIG. 3A shows a filter response of the reconfigurable filter 74 of the wavelength selective switch 32, for example. The reconfigurable filter 74 that is configured on a slice-by-slice basis as shown by the vertical lines in FIG. 3A. For each slice, the reconfigurable filter 74 can be configured to either pass the light within the slice (this is known as an "open slice") or block the light within the slice (this is known as a "blocked slice"). To pass a carrier frequency 80, for example, multiple slices 82-1 to 82-n of the reconfigurable filter 13 can be set to open. As shown in FIG. 3A, a series of adjacent open slices shows an ideal behavior with a flat response of 0 dB attenuation. Similarly, a series of blocked slices 84-1 to 84-n shows an ideal behavior with a flat response of max attenuation. However, because of the non-ideal response of the reconfigurable filter 74 for the wavelength selective switch 32, for example, an open slice followed by a blocked slice shows a roll-off effect that needs to be accounted for in a wavelength channel plan. The common way to deal with this non-ideal filtering effect is by allocating enough spectrum in between channels (or superchannels) so that the roll-off can be accommodated for. For example, in FIG. 3A channels should occupy a spectral region only slightly wider than the two central slices of the "open slice" group and leave the remaining 2 open slices almost un-occupied to avoid filtering effects. Therefore, the channels (or superchannel) spectral spacing must be increased to accommodate for these un-occupied slices. This additional spectral spacing allocated in between channels (or superchannels), is referred to in the art as a "guard-band." Conventionally, the wavelength selective switch 32 always keeps the slices related to the guard-band of a channel to be passed in an open state.

FIG. 3A also shows that a blocked slice followed by an open slice does not have an ideal behavior: the isolation of these blocked slices is reduced. This effect causes additional leakage of light and increases the coherent crosstalk caused by the presence of "aggressors" wavelengths.

FIG. 3 shows a wavelength channel plan with the presence of a guard band 80. The optical signals or carriers included in each group or band are centered around a wavelength or frequency specified by the International Telecommunications Union (ITU) standard wavelength or frequency grid. Alternatively, each of the optical carriers is provided according to a unique nonstandard grid that is optimized for a specific embodiment. For example, as shown in FIG. 3, a plurality of optical signals or carriers $\lambda 1,1$ to $\lambda 1,10$ are grouped or banded together to form a superchannel SC1, and a plurality of optical signals or carriers $\lambda 2,1$ to $\lambda 2,10$ are grouped or banded together to form a superchannel SC2. As shown, the plurality of sub-wavelength channels $\lambda 1,1$ to $\lambda 1,10$ and $\lambda 2,1$ to $\lambda 2,10$ are closely spaced so as to optimize the occupied bandwidth BW1 and BW2 of the superchannels SC1 and SC2, respectively. Each carrier $\lambda 1,1$ to $\lambda 1,10$ and $\lambda 2,1$ to $\lambda 2,10$ of SC1 and SC2, respectively, may be considered a sub-wavelength channel banded around a center wavelength $\lambda 1$ and $\lambda 2$ identifying the superchannels SC1 and SC2, respectively. As described above, each of the superchannels SC1 and SC2 may be multiplexed or independently routed through the optical communication system 10 shown in FIG. 1.

In an exemplary embodiment, the plurality of sub-wavelength channels or carriers $\lambda 1,1$ to $\lambda 1,10$ and $\lambda 2,1$ to $\lambda 2,10$ are preferably periodically spaced from each other by a fixed frequency spacing according to an embodiment specific unique frequency grid. In other words, as shown in FIG. 3, a corresponding frequency spacing between the center wavelengths $\lambda 1,1$ and $\lambda 1,2$, shown as $\Delta f$, is the same for each of the other carriers in a superchannel. Thus, each of the carriers are said to be periodically spaced from each other by $\Delta f$. Because a transmit node 11' can produce a plurality of superchannels $\lambda 1$ to $\lambda n$, as shown in FIG. 2, in order to utilize common optical components for each superchannel, it is preferred that the carriers for each superchannel utilize the same fixed frequency spacing $\Delta f$ as shown in FIG. 3.

It is understood that the characteristics of optical components can vary with respect to temperature and other environmental conditions. Thus, throughout the disclosure where a "fixed" frequency or wavelength spacing is described, such fixed spacing is a theoretical or ideal fixed spacing that is desired, but may not be achieved exactly due to environmental conditions. Thus, any substantially similar spacing, frequency or wavelength within expected optical component variations may correspond to the ideal fixed spacing described.

Figure 4:
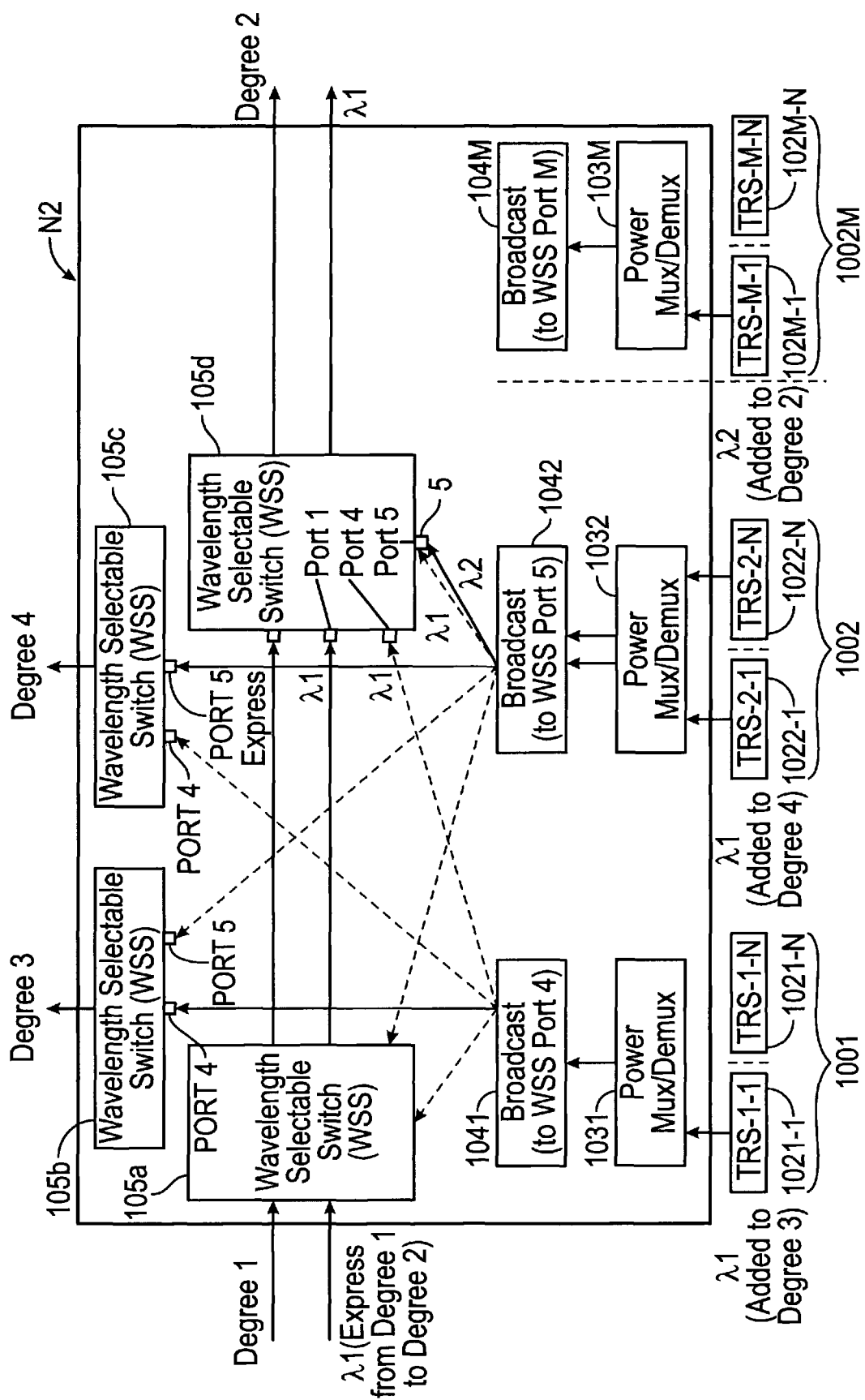
FIG. 4 illustrates an exemplary node consistent with aspects of the present disclosure.

As shown in FIG. 4, node N2 may be a colorless, directionless, and contentionless node based on route and select architecture and on broadcasted add wavelengths. In this example node N2 is a four degree node in which up to N different wavelengths, transmitted by M number of transmitter sets 100 (labeled as $100_{1-M}$) of a number N of transmitters 102 (labeled as $102_{M-N}$), are combined with multiplexers $103_{1-M}$. A plurality of broadcast modules $104_{1-M}$ within node N2 then splits the combined signal in a certain number of replicas and each replica is sent to a different mux/demux 105a, 105b, 105c and 105d. Each broadcast module $104_{1-M}$ receives and broadcasts non-adjacent wavelengths. In one embodiment, the channel plan is configured to make sure that each broadcast module $104_{1-M}$ receives only non-adjacent wavelengths. The mux/demux 1055a-d can be wavelength selective switches. Each of the mux/demux 105a-d have a plurality of input ports, which are shown by way of example and brevity on mux/demux 105d as input ports "port 1", "port 4" and "Port 5". The mux/demux 105a, 105b, 105c and 105d can have more or less ports and specific input ports are shown by way of example. Each of the input ports of the mux/demux 105a, 105b, 105c and 105d is associated with a reconfigurable filter, such as the reconfigurable filter 74 shown by way of example in FIG. 2.

In FIG. 4, it is assumed that certain of the input ports of the mux/demux 105d are used to express the four degrees, and the rest of the input ports are used for Add/Drop. In this example input ports 4 and 5 are specifically shown and used for Add/Drop purposes. In this example, $\lambda_1$ is received on the mux/demux 105a and passed to Port 1 of mux/demux 105d. The wavelength $\lambda_1$ is also generated by the transmitter sets $106_{1-M}$ from transmitters $102_{1-1}$ and $102_{2-1}$ and then replicated by the broadcast modules $104_1$ and $104_2$ such that a replica of $\lambda_1$ from transmitter $102_{1-1}$ is present at port 4 on each of the mux/demux 5a-d, and a replica of $\lambda_2$, for example, from transmitter $2_{1-2}$ is present at port 5 on each of the mux/demux 5a-d. Therefore, the mux/demux 105d of degree 2 has to let through the expressed wavelength $\lambda_1$ (from degree 1) and the mux/demux 105d has to block the wavelength $\lambda_1$ present at port 4 and the wavelength $\lambda_1$ present at port 5. In this example, the reconfigurable filters at ports 4 and 5 of mux/demux 105d are configured to block $\lambda_1$ and any stopbands in the wavelength channel plan. Port 5 receives both $\lambda_1$ and $\lambda_2$ and has the reconfigurable filter configured to pass $\lambda_2$, and block $\lambda_1$. The method of the present disclosure adopts a channel plan and an Add/Drop structure that allows only non-adjacent channels at the same add port of the wavelength selective switches 105a-d. This arrangement avoids the presence of "first aggressors" and thereby reduces coherent cross-talk in the network.

The method can be illustrated by a set of formulae. Referring to FIG. 4, the channel emitted from the transponder TRS-M-N is indicated as _TRS-M-N. There is a set of formulae for each A/D mux structure connected to a single port of the wavelength selective switches 105a-d that supplies only non-adjacent carriers to the ports. For instance, for the A/D mux structure formed of mux/demux 1031-103M, and broadcast modules 1041-104M connected to WSS port 4:

$\lambda$_TRS-1-1$\neq\lambda$_TRS-1-2$\neq$ . . . $\neq\lambda$_TRS-1-N—to avoid collisions at the power mux $\lambda$_TRS-1-1, $\lambda$_TRS-1-2 . . . $\lambda$_TRS-1-N must be spectrally non-adjacent—to avoid "first aggressors"

A similar set of formulae is used for all the other ports of the power mux/demux 103-1-M and 104-1-M. By applying this set of rules, all the possible configurations that enable the "first aggressor" presence are prevented. Therefore, the isolation of the wavelength selective switches 104a-d, for example, blocking wavelength λ1 is always optimal. In fact, at each port of the wavelength selective switches 105a-d a wavelength will always have the adjacent slices closed. For Instance, by applying these rules to the configuration in FIG. 4, both wavelengths λ1 and λ2 can be added to port 5 of wavelength selective switches 105a-d only if wavelength λ2 is not spectrally adjacent to wavelength λ1. If wavelengths λ1 and λ2 are spectrally adjacent, then the channel plan would specify that both wavelengths λ1 and λ2 cannot be added to the same port.

CONCLUSION

The mechanisms proposed in this disclosure circumvent the problems described above. To solve the aggressor issue and to reduce the cross-talk caused by the aggressors as described in the background, the present disclosure uses wavelength channel plans in which only non-adjacent carriers are supplied to an input port of a wavelength selective switch within a colorless, directionless and contentionless node to reduce the impact of coherent crosstalk in colorless, directionless, and contentionless networks.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. An apparatus, comprising:
a first optical transmitter configured to supply a plurality of first optical signals, each of the plurality of first optical signals being spaced apart from one another spectrally, the plurality of first optical signals constituting a first superchannel;
a second optical transmitter configured to supply a plurality of second optical signals, each of the plurality of second optical signals being spaced apart from one another spectrally, the plurality of second optical signals constituting a second superchannel;
a wavelength selective switch having a first input port and a second input port;
a first broadcast module configured to supply to the first input port of the wavelength selective switch first ones of the plurality of first optical signals and first ones of the plurality of second optical signals, collectively said first ones of the plurality of first optical signals and said first ones of the plurality of second optical signals constituting first selected optical signals, each of the first selected optical signals being associated with a corresponding one of first slices of a spectrum, each of the first slices being open; and
a second broadcast module configured to supply to the second input port of the wavelength selective switch second ones of the plurality of first optical signals and second ones of the plurality of second optical signals, collectively said second ones of the plurality of first optical signals and said second ones of the plurality of second optical signals constituting second selected optical signals, each of the second selected optical signals being associated with a corresponding one of second slices of the spectrum, each of the second slices being open,
wherein the first input port of the wavelength selective switch receives only the first selected optical signals, each of the first slices being spectrally spaced from one another such that the first slices are first non-adjacent slices, and
wherein the second input port of the wavelength selective switch receives only the second selected optical signals, each of the second slices being spectrally spaced from one another, such that the second slices are second non-adjacent slices, wherein the wavelength selective switch is a first wavelength selective switch, and wherein the plurality of first optical signals are passed through a second wavelength selective switch prior to being received by the first input port, the first and second wavelength selective switches being a part of a first node, and the first optical transmitter being a part of a second node different from the first node.

2. An optical device, comprising:
a wavelength selective switch having a first input port and, a second input port;
a first broadcast module configured to supply to the first input port of the wavelength selective switch first ones of a plurality of first optical signals and first ones of a plurality of second optical signals, collectively said first ones of the plurality of first optical signals and said first ones of the plurality of second optical signals constituting first selected optical signals, each of the first selected optical signals being associated with a corresponding one of first slices of a spectrum, each of the first slices being open; and
a second broadcast module configured to supply to the second input port of the wavelength selective switch second ones of the plurality of second optical signals and second ones of the plurality of second optical signals, collectively said second ones of the plurality of first optical signals and said second ones of the plurality of second optical signals constituting second selected optical signals, each of the second selected optical signals being associated with a corresponding one of second slices of the spectrum, each of the second slices being open,
wherein the first input port of the wavelength selective switch receives only the first selected optical signals, each of the first slices being spectrally spaced from one another such that the first slices are first non-adjacent slices, and
wherein the second input port of the wavelength selective switch receives only the second selected optical signals, each of the second slices being spectrally spaced from one another, such that the second slices are second non-adjacent slices,
wherein the wavelength selective switch is a first wavelength selective switch, and
wherein the plurality of first optical signals are passed through a second wavelength selective switch prior to being received by the first input port, the first and second wavelength selective switches being a part of a first node, and the first optical transmitter being a part of a second node different from the first node.

3. The optical device of claim 2, further comprising: a multiplexer receiving the first non-adjacent optical signals and supplying the first non-adjacent optical signals to the first broadcast module.

4. The optical device of claim 2, wherein the wavelength selective switch is a first wavelength selective switch, the optical device further comprising a second wavelength selective switch having a third input port and a fourth input port, and wherein the first broadcast module is configured to supply only the first non-adjacent optical signals to the first input port of the first wavelength selective switch and to the third input port of the second wavelength selective switch.

5. The optical device of claim 4, wherein the second broadcast module is configured to supply only second non-adjacent optical signals to the second input port of the first wavelength selective switch, and to the fourth input port of the second wavelength selective switch.

6. A method,
implemented with a colorless, directionless, and contentionless reconfigurable optical add drop multiplexer node having a wavelength selective switch having a first input port, and a second input port, the method comprising:
supplying to the first input port of the wavelength selective switch first ones of a plurality of first optical signals and first ones of a plurality of second optical signals, collectively said first ones of the plurality of first optical signals and said first ones of the plurality of second optical signals constituting first selected optical signals, each of the first selected optical signals being associated with a corresponding one of first slices of a spectrum, each of the first slices being open; and
supplying to the second input port of the wavelength selective switch second ones of the plurality of first optical signals and second ones of the plurality of second optical signals, collectively said second ones of the plurality of first optical signals and said second ones of the plurality of second optical signals constituting second selected optical signals, each of the second selected optical signals being associated with a corresponding one of second slices of the spectrum, each of the second slices being open,
wherein the first input port of the wavelength selective switch receives only the first selected optical signals, each of the first slices being spectrally spaced from one another such that the first slices are first non-adjacent slices, and
wherein the second input port of the wavelength selective switch receives only the second selected optical signals, each of the second slices being spectrally spaced from one another, such that the second slices are second non-adjacent slices,
wherein the wavelength selective switch is a first wavelength selective switch, and wherein the plurality of first optical signals are passed through a second wavelength selective switch prior to being received by the first input port, the first and second wavelength selective switches being a part of a first node, and the first optical transmitter being a part of a second node different from the first node.

* * * * *